United States Patent
Jei et al.

(10) Patent No.: US 7,710,238 B2
(45) Date of Patent: May 4, 2010

(54) MOBILE TERMINAL CIRCUIT INCLUDING AN RFID TAG AND WIRELESS IDENTIFICATION METHOD USING THE SAME

(75) Inventors: Dae-Gunn Jei, Seongnam-si (KR); Seo-Young Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1104 days.

(21) Appl. No.: 10/777,807

(22) Filed: Feb. 12, 2004

(65) Prior Publication Data

US 2005/0075079 A1  Apr. 7, 2005

(30) Foreign Application Priority Data

Oct. 7, 2003  (KR) .................. 10-2003-0069669

(51) Int. Cl.
*H04Q 5/22* (2006.01)

(52) U.S. Cl. .................. 340/10.1; 340/3.51; 340/572.1; 340/572.4; 340/505; 340/825.72

(58) Field of Classification Search ................ 340/10.1, 340/3.51, 572.1, 572.4, 505, 10.4, 825.72, 340/825.69

See application file for complete search history.

(56) References Cited

U.S. PATENT DOCUMENTS

| 4,075,632 A | 2/1978 | Baldwin et al. |
| 4,360,810 A | 11/1982 | Landt |
| 4,739,328 A | 4/1988 | Koelle et al. |
| 4,782,345 A | 11/1988 | Landt |
| 4,786,907 A | 11/1988 | Koelle |
| 4,816,839 A | 3/1989 | Landt |

(Continued)

FOREIGN PATENT DOCUMENTS

CN  1255997  6/2000

(Continued)

OTHER PUBLICATIONS

Hall et al., "RF Rendez-Blue: Reducing Power and Inquiry Costs in Bluetooth-Enabled Mobile Systems", Proc. 11th IEEE Int. Conf. Comput. Communications and Networks (ICCCN), Oct. 2002.

*Primary Examiner*—Vernal U Brown
(74) *Attorney, Agent, or Firm*—The Farrell Law Firm, LLP

(57) ABSTRACT

A mobile terminal circuit for transmitting radio frequency identification (RFID) data to an RFID reader. The mobile terminal circuit comprises an antenna for communication with the RFID reader; a memory portion for storing RFID data together with mobile terminal protocol data; a codec for encoding the RFID data into RFID codec data; a modulator connected to the codec, for modulating the RFID codec data into RFID modulation data; a processor connected to the memory portion, for extracting RFID data stored in the memory portion and delivering the extracted RFID data to the codec; a detector connected to the antenna and the processor, for informing the processor of approach of the RFID reader; a first clock generator connected to the processor and the memory portion, for providing operation timing to the processor and the memory portion; and a second clock generator connected to the first clock generator, the codec and the modulator, for providing operation timing to the codec and the modulator.

12 Claims, 6 Drawing Sheets

U.S. PATENT DOCUMENTS

| | | | |
|---|---|---|---|
| 4,835,337 A | 5/1989 | Shimizu et al. | |
| 4,853,705 A | 8/1989 | Landt | |
| 6,172,518 B1 * | 1/2001 | Jenkins et al. | 326/37 |
| 6,873,259 B2 | 3/2005 | Teraura | |
| 6,972,662 B1 * | 12/2005 | Ohkawa et al. | 340/10.1 |
| 7,554,383 B2 | 6/2009 | Arisawa et al. | |
| 2002/0080864 A1 * | 6/2002 | Kuttruff et al. | 375/211 |
| 2004/0198233 A1 * | 10/2004 | Pratt et al. | 455/67.11 |
| 2005/0215280 A1 * | 9/2005 | Twitchell, Jr. | 455/553.1 |

FOREIGN PATENT DOCUMENTS

| | | |
|---|---|---|
| JP | 02-022996 | 1/1990 |
| JP | 2003-36427 | 2/2003 |
| JP | 2003-150922 | 5/2003 |
| KR | 10-2002-0090929 | 5/2002 |
| WO | WO 01/39103 | 5/2001 |
| WO | WO 03/025834 | 3/2003 |
| WO | WO 03/061146 | 7/2003 |

* cited by examiner

MOBILE TERMINAL CIRCUIT INCLUDING AN RFID TAG AND WIRELESS IDENTIFICATION METHOD USING THE SAME

PRIORITY

This application claims priority under 35 U.S.C. § 119 to an application entitled "Mobile Terminal Circuit Combined with RFID Tag and Wireless Identification Method Using the Same" filed in the Korean Intellectual Property Office on Oct. 7, 2003 and assigned Serial No. 2003-69669, the contents of which are incorporated herein by reference.

BACKGROUND OF THE INVENTION

1. Field of the Invention

The present invention relates generally to a radio frequency identification (RFID) tag, which is increasing in frequency of use and importance, and a widely-spread mobile terminal, and in particular, to a mobile terminal circuit including an RFID tag in one body and a wireless identification method using the same.

2. Description of the Related Art

An RFID transponder, or an RFID tag, was developed by United States National Laboratory for Department of Agriculture for the purpose of identifying livestock. An electric code for identifying an animal is recorded in a RFID tag, and then inserted into or attached to the animal. An interrogator (or a reader) for reading the electric code is installed in a cattle shed to conveniently monitor whether an animal has returned. The reader transmits an RF (Radio Frequency) signal to the RFID tag, and then, an electric code recorded in the RFID tag is delivered to the reader after being modulated by a modulator in the RFID tag. This procedure is called "backscatter modulation." The RFID tag has an antenna coil to transmit the modulated signal to the reader therethrough. An early such system is well disclosed in U.S. Pat. Nos. 4,075,632 and 4,360,810.

Over time, technology for identifying a moving object has been applied to additional fields other than cattle management. For example, such technology has been applied to a vehicle, a container vessel, a railcar, etc., and information recorded in an RFID tag of such transportation means is used in tracking a position of the transportation means and identifying the contents of freight. Such applications and related arts are well disclosed in U.S. Pat. Nos. 4,739,328, 4,782,345, 4,786,907, 4,816,839, 4,835,377, and 4,853,705.

Recently, RFID technology is tested in various fields, and among the various fields, a communication system has attracted public attention due to its various possible applications. For example, since a mobile communication system holds a great number of subscribers, it can easily make profits by commercializing an application service based on the RFID technology. Currently, a mobile communication system has been saturated in terms of an earning rate, so service providers are eagerly searching for new application services capable of creating additional profits.

If RFID technology is introduced into the mobile communication system, it is expected that various additional services for a cellular environment can be provided. Accordingly, it is most urgently necessary to combine current RFID devices to a current cellular system.

Related prior art is disclosed in WO 01/39103 A1, WO 03/025834 A1, an IEEE paper entitled "RF Rendez-Blue: Reducing Power And Inquiry Costs In Bluetooth-Enabled Mobile Systems," (E. S. Hall, D. K. Vawdrey, and C. D. Knutson, in Proc. 11$^{th}$ IEEE Int. Conf. Comput. Communications and Networks (ICCCN), Miami, Fla., October 2002.) and Korean Patent Publication No. 2002-0090929.

WO 01/39103 A1 discloses a mobile terminal in which an identification (ID) module is added between an RF block and an antenna, and the mobile terminal includes a Bluetooth module. The ID module includes a mixer, and the mixer converts a backscatter type message transmitted from the ID module to a reader at an RFID frequency of 2.45 GHz into a baseband message before transmission so that it can be processed in a computer, or transmits the backscatter type message to a base station over a traffic channel specified by a mobile communication standard or a Bluetooth channel. This technology is characterized by connecting an independent ID module to an existing mobile terminal circuit via a mixer. Through this, a base frequency band, i.e., an exiting traffic channel or Bluetooth channel, is used as an RFID frequency band. Therefore, a combination between heterogeneous circuits is not described herein.

WO 03/025834 A1 discloses a mobile terminal combined with an RFID reader, in which information is transmitted and received over a frequency band of the mobile terminal. However, the reference does not mention that instead of the RFID reader, an RFID tag can be combined with the mobile terminal. In addition, since combination between the RFID reader circuit and the terminal circuit is not disclosed, one skilled in the art cannot predict a combination of the RFID tag circuit and the terminal circuit in the light of the connection between the RFID reader circuit and the terminal circuit.

The IEEE paper discloses a structure for connecting an RFID module to a Bluetooth module in parallel in order to reduce an initial processing time of the Bluetooth module, and this is very different from a single-body type structure proposed by the present invention.

Korean Patent Publication No. 2002-0090929 discloses technology in which an independent smart card sends data to a main processing unit (MPU) of a mobile terminal. However, the reference fails to propose the connection between the smart card and the MPU or its peripheral circuit. That is, it is nothing more than simply arranging an independent circuit and a processor in one device.

The above references mainly disclose parallel connection between an RFID module or tag and a terminal circuit, or propose resource sharing in terms of frequency. However, the conventional technologies have the following disadvantages.

First, it is difficult to achieve miniaturization of a mobile terminal. Although an RFID tag can be implemented through combination of one chip with an antenna coil, it must be implemented in a smaller size to meet a general tendency toward miniaturization of the mobile terminal.

Second, since the conventional RFID tag does not have its own power supply, electromotive force induced from a carrier of an RFID reader is used as electric power. In this case, it is difficult to provide sufficient electric power to the RFID tag in an environment where an air environment between the RFID reader and the RFID tag is influenced by noises. |As a result, the RFID tag may operate incorrectly.

SUMMARY OF THE INVENTION

It is, therefore, an object of the present invention to provide a mobile terminal circuit including an RFID tag, capable of securing miniaturization of the mobile terminal and a stable RFID operation, and a wireless identification method using the same.

In accordance with a first aspect of the present invention, there is provided a mobile terminal circuit for transmitting radio frequency identification (RFID) data to an RFID reader. The mobile terminal circuit comprises: an antenna for communication with the RFID reader; a memory portion for storing RFID data together with mobile terminal protocol data; a codec for encoding the RFID data into RFID codec data; a modulator connected to the codec, for modulating the RFID codec data into RFID modulation data; a processor connected to the memory portion, for extracting RFID data stored in the memory portion and delivering the extracted RFID data to the codec; a detector connected to the antenna and the processor, for informing the processor of approach of the RFID reader; a first clock generator connected to the processor and the memory portion, for providing operation timing to the processor and the memory portion; and a second clock generator connected to the first clock generator, the codec and the modulator, for providing operation timing to the codec and the modulator.

In accordance with a second aspect of the present invention, there is provided a mobile terminal circuit for transmitting radio frequency identification (RFID) data to an RFID reader. The mobile terminal circuit comprises: an antenna for communication with the RFID reader; a first clock generator for providing operation timing to each electric element of the mobile terminal circuit; an RFID module including an RFID memory for storing RFID data; a codec for encoding the RFID data into RFID codec data; a modulator connected to the codec, for modulating the RFID codec data into RFID modulation data; and a second clock generator connected to the first clock generator, the codec and the modulator, for providing operation timing to the codec and the modulator; a power block for providing operation power to respective electric elements of the mobile terminal circuit; a processor connected to the power block, the first clock generator and the RFID module, for enabling an operation of the power block; and a detector connected to the antenna and the processor, for informing the processor of approach of the RFID reader. The processor commands the power block to provide electric power to the RFID module, and the RFID module generates RFID modulation data using the RFID memory, the codec and the modulator.

In accordance with a third aspect of the present invention, there is provided a mobile terminal circuit for transmitting radio frequency identification (RFID) data to an RFID reader. The mobile terminal circuit comprises: an antenna for communication with the RFID reader; a memory portion for storing RFID data together with mobile terminal protocol data; an RFID module performing an RFID function and including a second clock generator for providing RFID operation timing using a system clock output from a first clock generator; a processor connected to the memory portion and the RFID module, for extracting RFID data stored in the memory portion and delivering the extracted RFID data to the RFID module; a detector connected to the antenna and the processor, for informing the processor of approach of the RFID reader; and the first clock generator connected to the processor and the memory portion, for providing operation timing to the processor and the memory portion.

In accordance with a fourth aspect of the present invention, there is provided a method for identifying a radio frequency in a mobile terminal including a radio frequency identification (RFID) module. In the method, a detector informs a processor of approach of an RFID reader upon detecting the approach of the RFID reader. The processor extracts RFID data from a memory portion and delivers the extracted RFID data to the RFID module upon perceiving the approach of the RFID reader. The RFID module encodes and modulates the delivered RFID data and transmits the modulated RFID data to the RFID reader.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
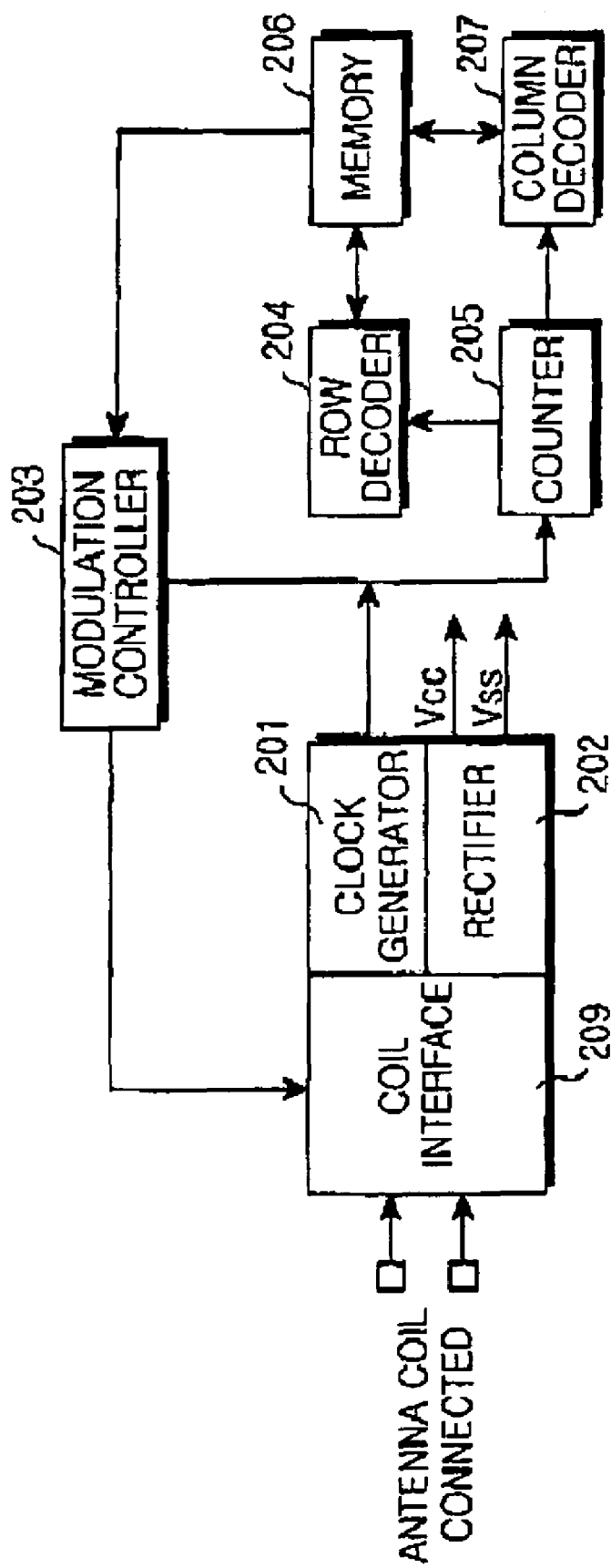
FIG. 1 is a block diagram illustrating a structure of a conventional RFID tag.

Several preferred embodiments of the present invention will now be described in detail herein below with reference to the annexed drawings. In the drawings, the same or similar elements are denoted by the same reference numerals even though they are depicted in different drawings. In the following description, detailed descriptions of known functions and configurations incorporated herein have been omitted for conciseness.

FIG. 1 is a block diagram illustrating a structure of a passive RFID tag. More specifically, FIG. 1 illustrates RFID tag chip model No. MCRF200 made by Microchip. Referring to FIG. 1, a coil interface 209 is a connection part between an antenna coil (not shown) and RFID circuit elements. The antenna coil generates induced electromotive force through inductive coupling between an RFID reader (not shown) and the RFID tag in accordance with Faraday's law as the RFID reader approaches the RFID tag. A voltage level of the antenna coil is changed according to a modulated signal output from a modulation circuit (not shown) in the coil interface 209. A rectifier 202 rectifies an AC (Alternating Current) voltage of the induced electromotive force, and provides a DC (Direct Current) voltage to the other elements of the RFID tag circuit. A clock generator 201 generates a system clock by extracting a carrier frequency from a signal transmitted from the RFID reader. This clock provides a baud rate, a modulation rate, and a programming rate to the other elements. A row decoder 204 and a column decoder 207 extract ID data stored in a memory 206 at a clock rate, and encode the extracted ID data by non-return zero (NRZ) direct coding, differential biphase coding, or Manchester biphase coding before modulation, to thereby generate a serial data stream. A modulation controller 203 modulates a serial data stream received via the decoders 204 and 207 by a predetermined modulation scheme, e.g., frequency shift keying (FSK) or phase shift keying (PSK), and delivers the modulated data stream to the coil interface 209. A counter 205 counts a clock output from the clock generator 201, and provides a count value to the row decoder 204 and the column decoder 207.

Figure 2:
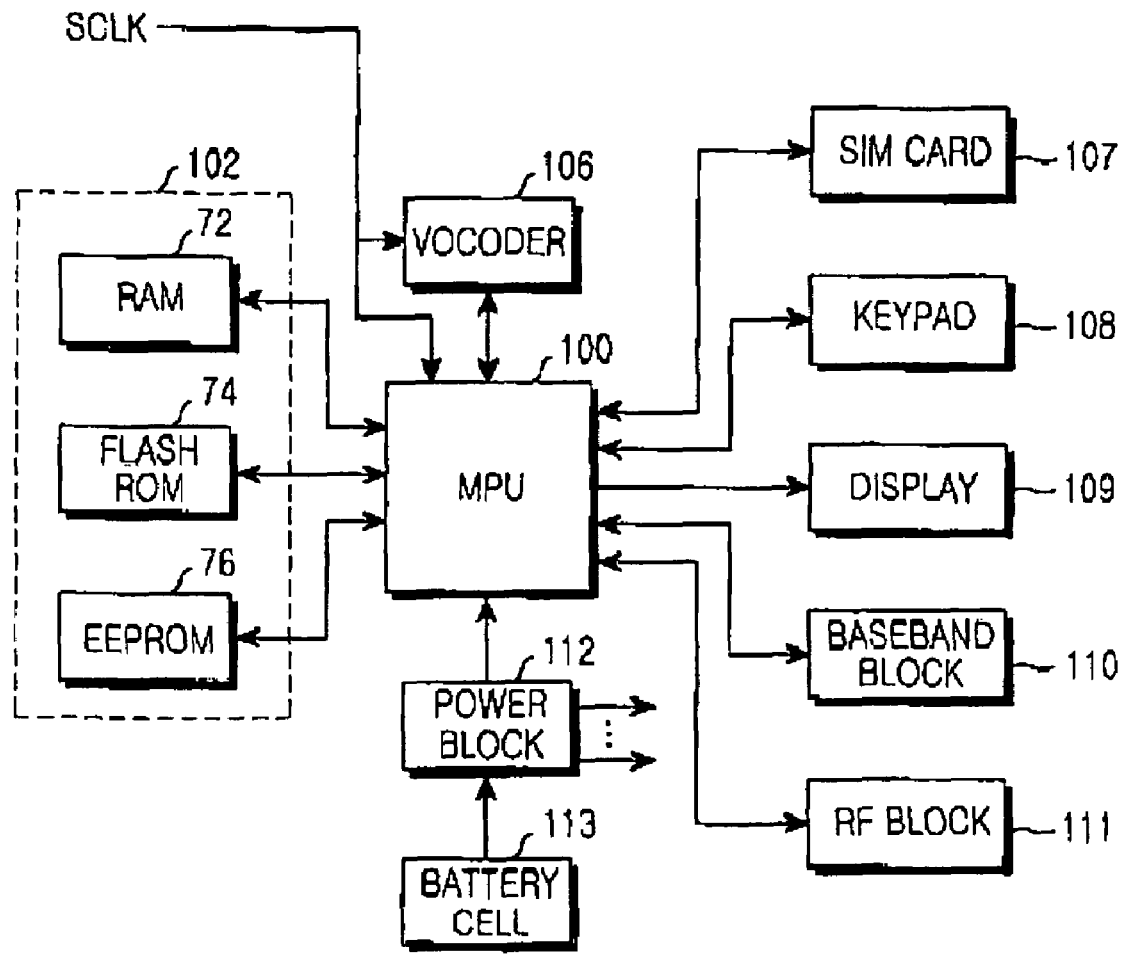
FIG. 2 is a block diagram illustrating a structure of a conventional mobile terminal.

FIG. 2 is a block diagram illustrating a structure of a conventional mobile terminal. Referring to FIG. 2, a main processing unit (MPU) 100 controls the overall operation of the mobile terminal. The MPU 100 is provided with a system clock SCLK. A memory portion 102 is comprised of a system RAM (Random Access Memory) 72, a flash ROM (Read Only Memory) 74, and an EEPROM (Electrically Erasable and Programmable ROM) 76. An RF (Radio Frequency) block 111 processes an RF signal transmitted/received via an antenna (not shown). A baseband block 110 converts a digital signal received from the MPU 100 into an analog signal, generates an IF (Intermediate Frequency) signal from the analog signal, and delivers the IF signal to the RF block 111. Further, the baseband block 110 processes an IF signal received from the RF block 111 and delivers the IF signal to the MPU 100.

A keypad 108 and a display 109 serve as an input means and an output means, respectively. A vocoder 106 converts user voice into a digital signal, and delivers the digital signal to the MPU 100. A SIM (Subscriber Identification Module) card 107, in a GSM (Global System for Mobile communications) system, stores user information and delivers the user information to a related circuit. For example, in a CDMA (Code Division Multiple Access) system, user information in the SIM card can be stored in the memory portion 102.

Additionally, a battery cell 113 provides electric power to the mobile terminal. A power block 112 provides appropriate electric power to each element of the mobile terminal using the electric power supplied from the battery cell 113.

Figure 3:
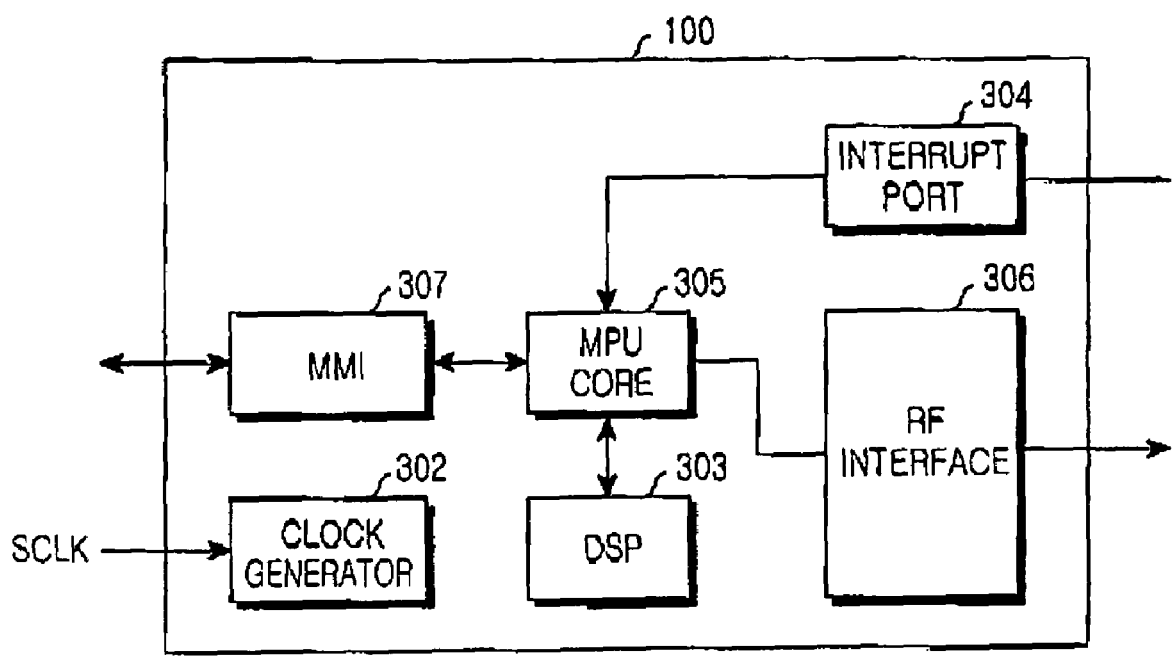
FIG. 3 is a detailed block diagram illustrating the MPU illustrated in FIG. 2.

FIG. 3 is a detailed block diagram illustrating the MPU 100 illustrated in FIG. 2. For example, PCF5083 by Philips, AD6526 by Analog Devices, and DSP56654 by Motorola can be used as the MPU 100 of the mobile terminal. As illustrated in FIG. 3, the MPU 100 includes an MPU core 305, a DSP (Digital Signal Processor) 303, a clock generator 302, an RF interface 306, a man-machine interface (MMI) 307, and an interrupt port 304. While the MPU 100 includes other elements, only those illustrated in FIG. 3 are relevant to the present invention. A detailed description of the other elements can be found in the above-cited references.

In operation, the clock generator 302 receives a source clock (e.g., 13 MHz) from the system clock SCLK, divides the source clock, and provides appropriate clocks to the peripheral elements. The MPU core 305 serves as a main operator of the MPU 100. For example, a 32-bit ARM7TDMI® chip by ARM (Advanced RISC Machines) or an M-Core® chip by Motorola can be used as the MPU core 305. The interrupt port 304, one of external ports of the MPU 100, detects an interrupt generated from an external device. The RF interface 306 and the MMI 307 serve as an interface between the MPU core 305 and the RF block 111 and an interface between the MPU core 305 and the keypad 108 and the display 109, respectively. The DSP 303 performs operations requiring fast calculation in a mobile communication system, e.g., modulation/demodulation and baseband modulation.

Figure 4:
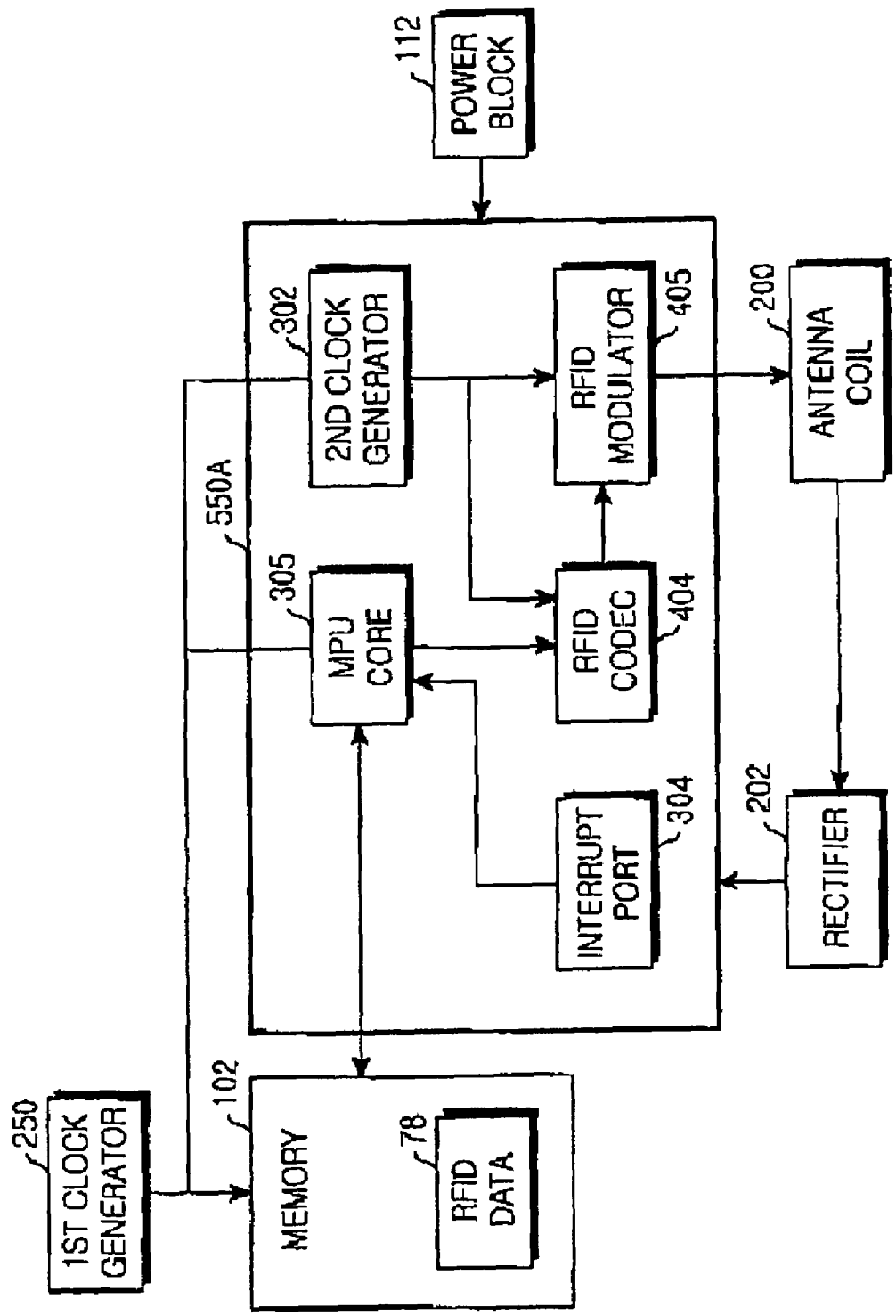
FIG. 4 is a block diagram illustrating a structure of a mobile terminal including an RFID tag according to a first embodiment of the present invention.

FIG. 4 is a block diagram illustrating a structure of a mobile terminal including an RFID tag according to a first embodiment of the present invention. It should be noted that known elements of the mobile terminal other than the elements related to the connection between the mobile terminal and the RFID tag are not illustrated in the drawing for simplicity.

According to a first embodiment of the present invention, referring to FIG. 4, an MPU 550A of the mobile terminal includes an RFID codec 404 and an RFID modulator 405, which are elements of an RFID tag. Moreover, the memory portion 102 of the mobile terminal additionally stores RFID data 78 together with mobile terminal protocol data.

Referring to FIG. 2, the EEPROM 76 of the mobile terminal is an element of the memory portion 102. Commonly, the EEPROM 76 stores initial setup values of the RF block 111, the display 109 and a voice volume, a user defined value such as address book data, and WAP (Wireless Application Protocol) data. However, as the latest flash ROM increases in its capacity, data stored in the low-speed EEPROM 76 tends to be stored in the high-speed flash ROM 74. Therefore, it is common that the EEPROM 76 has an enough space capable of storing surplus data. Therefore, it is profitable to store RFID data in this idle space.

Referring to FIG. 3, the clock generator 302 divides the source clock provided from the system clock SCLK illustrated in FIG. 2 into several clocks, in order to provide appropriate clocks to the peripheral elements. Therefore, it is also possible to additionally divide the source clock into a clock for the elements of the RFID tag.

In FIG. 4, the RFID modulator 405 can be easily implemented within the MPU 550A. A modulation scheme used in the RFID technology includes FSK or PSK, which is lower in complexity than Gaussian minimum shift keying (GMSK), i.e., a conventional modulation scheme. Therefore, the RFID modulator 405 can be implemented using the conventional related logic and technology. Also, the RFID codec 404 is lower in complexity and simpler in implementation than the conventional communication coding.

The interrupt port 304 detects an approach of an RFID reader (not shown), and indicates a time when stored RFID data is to be transmitted. If the RFID reader approaches the antenna coil 200, then induced electromotive force is generated and provided to the rectifier 202. The rectifier 202 converts the induced electromotive force into a DC signal. The interrupt port 304 serving as a detector detects the DC signal. Such a detector can also be implemented using a frequency detector instead of the interrupt port 304. When induced electromotive force is generated in the antenna coil 200, it indicates that an electric wave of a particular frequency band is generated. Therefore, the MPU core 305 can detect an approach of the RFID reader through the frequency detector that detects a variation in the frequency. For example, the TDA7021T by Philips can be used as the frequency detector.

Upon detecting the approach of the RFID reader through the interrupt port 304, the MPU core 305 issues an order that RFID data stored in the memory portion 102 should be delivered to the RFID codec 404. Upon receiving the RFID data, the RFID codec 404 encodes the received RFID data into RFID codec data, and delivers the RFID codec data to the RFID modulator 405. The RFID modulator 405 modulates the RFID codec data, and delivers the modulated RFID data to the RFID reader through the antenna coil 200.

In FIG. 1, if the RFID reader approaches the RFID tag, the clock generator 201 extracts a clock and provides the clock to the other elements, and the rectifier 202 provides electric power to the elements. At this point, elements other than the rectifier 202 are reset, so it is possible to detect a transmission time of the stored data. However, in a certain environment, an unstable clock may be extracted from a carrier of the RFID reader, causing misoperation of the RFID tag. Also, detecting a data transmission point through power providing can be affected according to a surrounding environment.

However, the present invention, which has the structure illustrated in FIG. 4 can effectively resolve such problems. That is, since most elements of the RFID tag are arranged in the MPU 550A, stable electric power from the power block 112 is provided to each element of the RFID tag. In addition, the RFID tag is provided with a stable internal clock of the mobile terminal, instead of a clock extracted from the carrier of the RFID reader. As illustrated in FIG. 4, a first clock generator 250 is connected not only to the MPU core 305 and the memory portion 102, but also to electric elements of the mobile terminal circuit, and provides operation timing to them. A system clock SCLK output from the first clock generator 250 is provided to a second clock generator 302, and the second clock generator 302 is connected to the RFID codec 404 and the RFID modulator 405, and provides operation timing to them.

Figure 5:
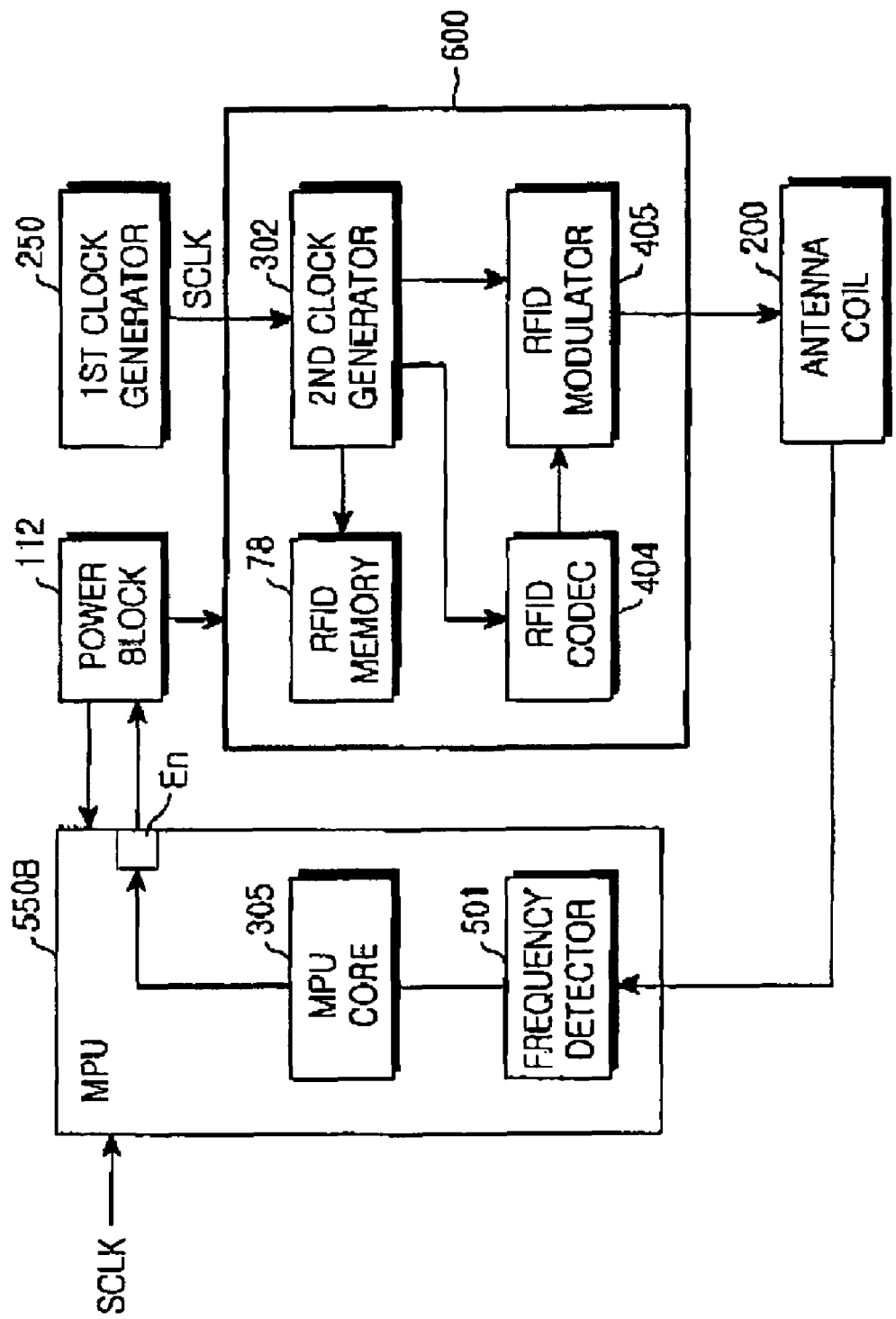
FIG. 5 is a block diagram illustrating a structure of a mobile terminal including an RFID tag according to a second embodiment of the present invention.

FIG. 5 is a block diagram illustrating a structure of a mobile terminal including an RFID tag according to a second embodiment of the present invention, in which main elements of the RFID tag are implemented with one IC (Integrated Circuit). It should be noted that known elements of the mobile terminal other than the part related to the connection between the mobile terminal and the RFID tag are not illustrated in the drawing for simplicity.

Figure 6:
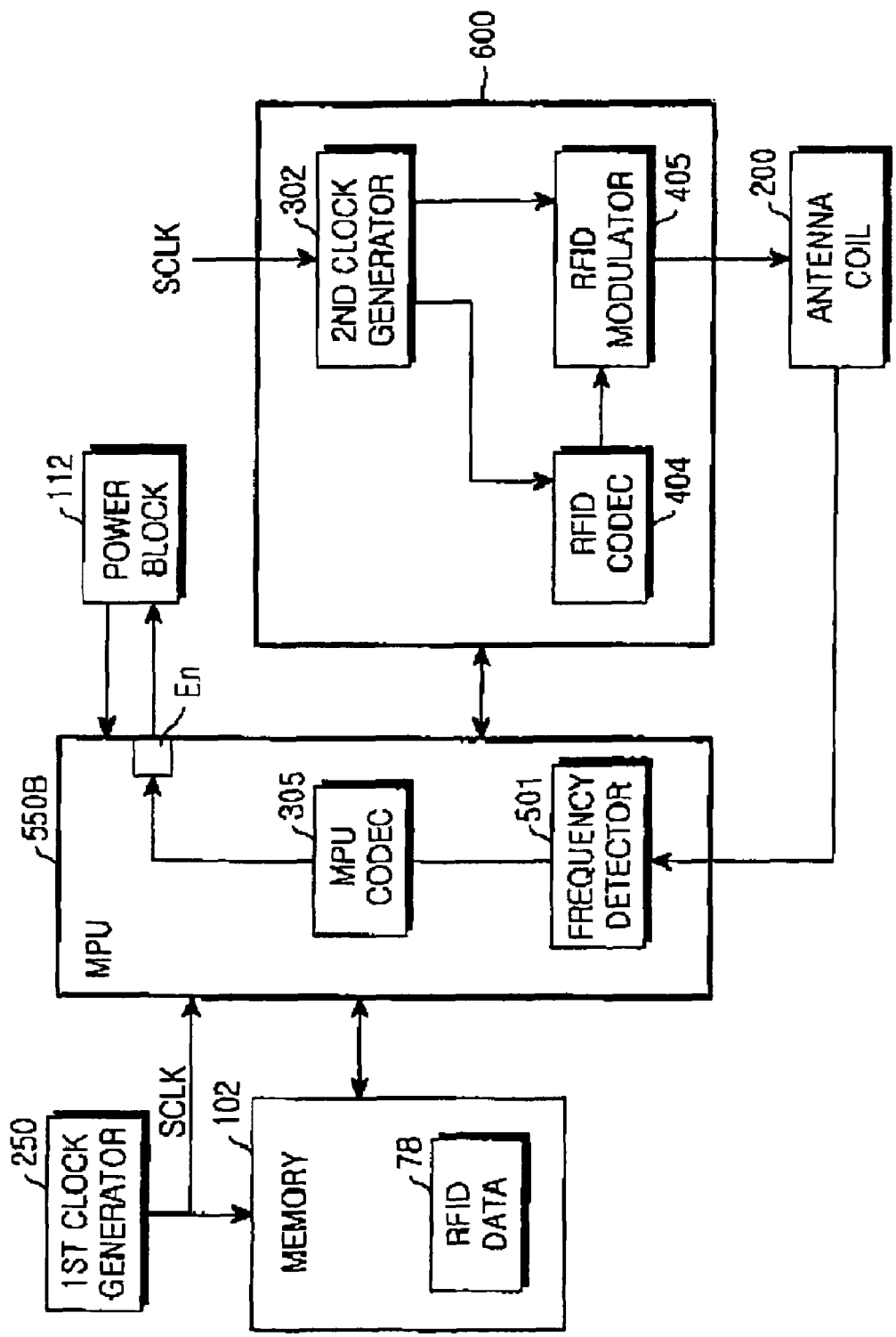
FIG. 6 is a block diagram illustrating a structure of a mobile terminal including an RFID tag according to a third embodiment of the present invention.

As illustrated in FIG. 5, an RFID codec 404, an RFID modulator 405, a second clock generator 302, and an RFID memory 78 are implemented with one IC 600 (hereinafter, referred to as an "RFID chip" or "RFID module"), and various modifications are available. FIG. 6 illustrates an example of one modification.

In the structure of FIG. 1, the RFID tag has the rectifier 202 and the clock generator 201. However, in the second embodiment of the present invention, instead of the clock generator 201, the second clock generator 302 receives a system clock SCLK, divides the received system clock SCLK and provides appropriate clocks to respective elements, as described in conjunction with FIG. 4. In addition, instead of the rectifier 202, a frequency detector 501 is arranged in the inside or outside of an MPU 550B to detect a variation in a frequency of an electric wave generated from an antenna coil 200 and deliver the detection result to an MPU core 305. The MPU core 305 informs the power block 112 of an operation time of the RFID chip 600 through an enable pin En.

The frequency detector 501 detects a frequency variation. Detection of the frequency variation can be implemented in several methods. For example, if the frequency detector 501 detects an ACK (acknowledgement) signal having a particular frequency while searching a frequency of an electric wave having a constant frequency generated from the antenna coil 200, it delivers the detected signal to the MPU core 305. The power block 112 provides electric power to the RFID chip 600 to enable an operation of each element.

Unlike the first embodiment, the second embodiment is characterized by using an RFID tag designed to be suitable to a mobile terminal instead of the conventional RFID tag by avoiding or minimizing modification of a structure of the MPU 550B, thereby achieving generalization and miniaturization of the mobile terminal.

FIG. 6 is a block diagram illustrating a structure of a mobile terminal including an RFID tag according to a third embodiment of the present invention. Compared with the RFID tag illustrated in FIG. 5, the RFID tag illustrated in FIG. 6 excludes the RFID memory 78 from the RFID module 600, and stores RFID data in the memory portion 102 as described in conjunction with FIG. 4.

As can be appreciated from the foregoing description, the present invention can implement combination of an RFID tag and a mobile terminal while securing miniaturization of the mobile terminal and a stable operation of the RFID tag. In addition, the present invention minimizes the mobile terminal circuit by increasing generalization of elements in implementing the combination.

While the present invention has been shown and described with reference to a certain preferred embodiments thereof, it will be understood by those skilled in the art that various changes in form and details may be made therein without departing from the spirit and scope of the invention as defined by the appended claims.

What is claimed is:

1. A mobile terminal circuit for transmitting radio frequency identification (RFID) data to an RFID reader, comprising:
   an antenna for communicating with the RFID reader;
   a memory portion for storing the RFID data together with mobile terminal protocol data;
   a codec for encoding the RFID data into RFID codec data;
   a modulator connected to the codec, for modulating the RFID codec data into RFID modulation data;
   a processor connected to the memory portion, for extracting RFID data stored in the memory portion and delivering the extracted RFID data to the codec;
   a detector connected to the antenna and the processor, for informing the processor of an approach of the RFID reader;
   a first clock generator connected to the processor and the memory portion, for providing operation timing to the processor and the memory portion; and
   a second clock generator connected to the first clock generator, the codec, and the modulator, for providing operation timing to the codec and the modulator.

2. The mobile terminal circuit of claim 1, wherein the processor extracts the RFID data from the memory portion in response to information indicating the approach of the RFID reader, provided from the detector, and delivers the extracted RFID data to the codec.

3. The mobile terminal circuit of claim 1, wherein the detector includes an interrupt port of the processor.

4. The mobile terminal circuit of claim 1, wherein the detector includes a frequency detector.

5. The mobile terminal circuit of claim 1, further comprising a rectifier for rectifying a voltage detected from a signal received via the antenna and delivering the rectified voltage to the processor.

6. A mobile terminal circuit for transmitting radio frequency identification (RFID) data to an RFID reader, comprising:
   an antenna for communicating with the RFID reader;
   a first clock generator for providing a first operation timing to each electric element of the mobile terminal circuit;
   an RFID module including an RFID memory for storing the RFID data; a codec for encoding the RFID data into RFID codec data; a modulator connected to the codec, for modulating the RFID codec data into RFID modulation data; and a second clock generator connected to the first clock generator, the codec, and the modulator, for providing a second operation timing to the codec and the modulator;
   a power block for providing operation power to electric elements of the mobile terminal circuit;
   a processor connected to the power block, the first clock generator, and the RFID module, for enabling an operation of the power block; and
   a detector connected to the antenna and the processor, for informing the processor of an approach of the RFID reader;
   wherein the processor commands the power block to provide electric power to the RFID module, and the RFID module generates the RFID modulation data using the RFID memory, the codec, and the modulator.

7. A mobile terminal circuit for transmitting radio frequency identification (RFID) data to an RFID reader, comprising:
   an antenna for communicating with the RFID reader;
   a first clock generator for providing a first operation timing to each electric element of the mobile terminal circuit;
   a memory portion for storing the RFID data together with mobile terminal protocol data;
   an RFID module including a codec for encoding the RFID data into RFID codec data; a modulator connected to the codec, for modulating the RFID codec data into RFID modulation data; and a second clock generator connected to the first clock generator, the codec, and the modulator, for providing a second operation timing to the codec and the modulator;
   a power block for providing operation power to the electric elements of the mobile terminal circuit;
   a processor connected to the power block, the first clock generator, the memory portion, and the RFID module, for enabling an operation of the power block, extracting the RFID data, and delivering the extracted RFID data to the RFID module; and
   a detector connected to the antenna and the processor, for informing the processor of an approach of the RFID reader;
   wherein the processor commands the power block to provide electric power to the RFID module, and the RFID module generates RFID modulation data by encoding and modulating the received RFID data.

8. The mobile terminal circuit of claim 7, wherein the processor commands the power block using an enable pin.

9. The mobile terminal circuit of claim 7, wherein the detector is included in the processor.

10. The mobile terminal circuit of claim 7, wherein the detector includes a frequency detector for detecting a variation in frequency.

11. A mobile terminal circuit for transmitting radio frequency identification (RFID) data to an RFID reader, comprising:
   an antenna for communicating with the RFID reader;
   a memory portion for storing the RFID data together with mobile terminal protocol data;
   an RFID module for performing an RFID function and including a second clock generator for providing RFID operation timing using a system clock output from a first clock generator;
   a processor connected to the memory portion and the RFID module, for extracting the RFID data stored in the memory portion and delivering the extracted RFID data to the RFID module; and
   a detector connected to the antenna and the processor, for informing the processor of an approach of the RFID reader;
   wherein the first clock generator is connected to the processor and the memory portion, and provides operation timing to the processor and the memory portion.

12. The mobile terminal circuit of claim 11, wherein the RFID module includes a codec for encoding the RFID data into RFID codec data; and a modulator connected to the codec, for modulating the RFID codec data into RFID modulation data.

* * * * *